W. J. SNOW.
HARROW.
APPLICATION FILED APR. 11, 1910.
970,964.
Patented Sept. 20, 1910.
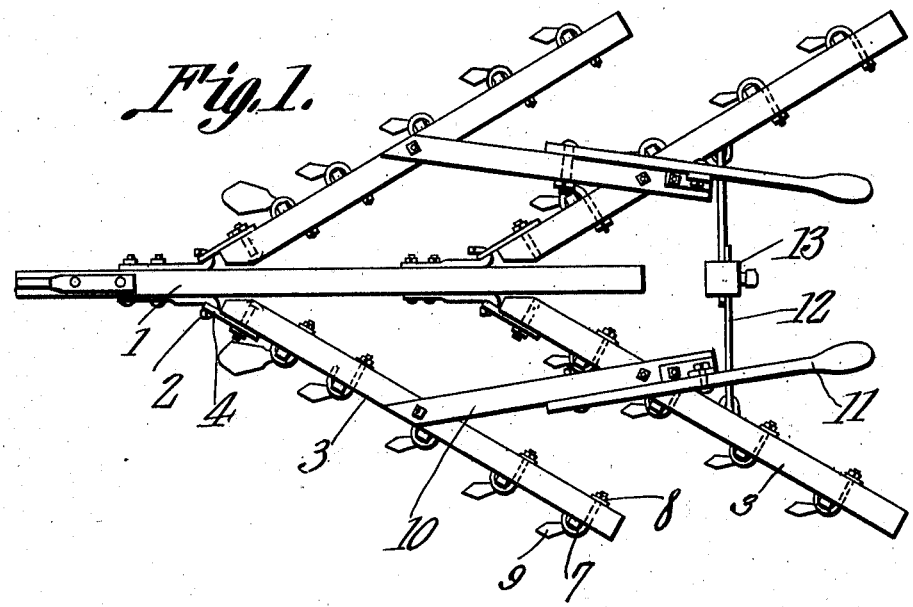
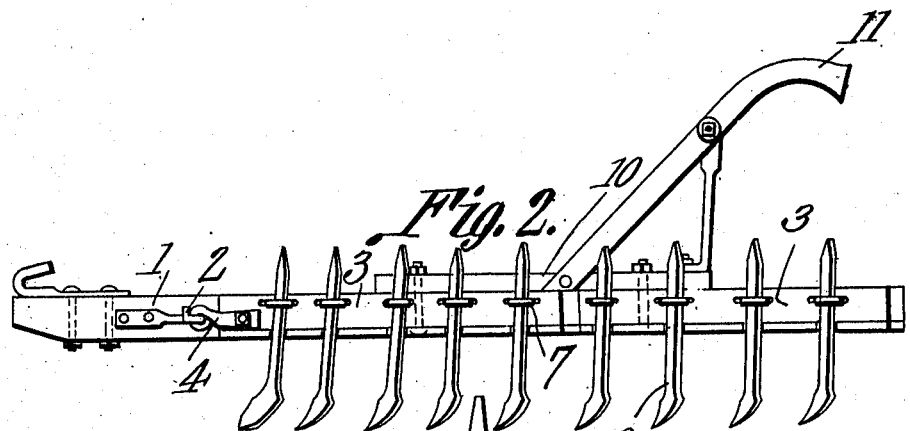
Witnesses
William J. Snow,
Inventor
by C. A. Snow & Co.
Attorneys

UNITED STATES PATENT OFFICE.

WILLIAM J. SNOW, OF VILONIA, ARKANSAS.

HARROW.

970,964.  Specification of Letters Patent.  Patented Sept. 20, 1910.

Application filed April 11, 1910. Serial No. 554,826.

*To all whom it may concern:*

Be it known that I, WILLIAM J. SNOW, a citizen of the United States, residing at Vilonia, in the county of Faulkner and State of Arkansas, have invented a new and useful Harrow, of which the following is a specification.

This invention relates to a scratch harrow and consists in the novel construction and arrangement of its parts as hereinafter shown and described.

The object of the invention is to provide a harrow consisting of a beam and side bars pivotally connected thereto and pivotally connected together in such manner that when the bars at one side of the beam are moved by an operator with relation to the beam the bars at the other side of the beam will be correspondingly moved with relation to the beam. That is to say that during the operation of harrowing it is possible for the operator to swing the bars at the sides of the beam to escape objects and to effect a more thorough scouring of the surface of the ground.

In the accompanying drawing:—Figure 1 is a top plan view of the harrow. Fig. 2 is a side elevation of the same. Fig. 3 is a detailed enlarged view of one of the harrow teeth and a portion of the supporting bar.

The harrow consists of a beam 1 having hooks 2 located at its opposite sides. Side bars 3 are provided at their forward ends with eyes 4 which engage the hooks 2. The bars 3 may be of the usual form as shown in Fig. 1. The said side bars 3 are preferably formed of angle irons and as illustrated in Fig. 3 of the drawings the lower flange of the bar is provided with recesses 5 and the upper flange of the bar is provided with elongated openings 6 located above said recesses. Hooks 7 pass through the openings 6 and are provided with clamp nuts 8. The intermediate portions of harrow teeth 9 are located in the recesses 5 and the upper portions of said teeth are engaged by the hooks 7 and when the nuts 8 are tightened the said harrow teeth are clamped in position against the bars 3. The teeth 9 may be pointed at one end and flattened at the other or they may be provided with any desired configuration at either end. It is of course understood that the teeth may be reversed in their positions upon the bars 3 and either end of the teeth may be caused to engage the soil. Also by adjusting the hooks 7 in the openings 6 the teeth may be pitched at any desired angle with relation to the soil.

Bars 10 are pivotally connected at their forward ends with the intermediate portions of the forward side bars 3 and at their rear ends are pivotally connected with the intermediate portions of the rear side bars 3. The bars 10 converge slightly toward each other at the rear of the harrow and each bar is provided with a handle 11. A longitudinally extensible brace 12 is pivotally connected at its ends with the inner or rear sides of the rear side bars 3. The said bar 12 consists of two sections which are overlapped at their inner ends and which are secured in an adjusted position by means of a clamp device 13. By this arrangement of the parts it will be seen that the beam serves as a spine for the harrow and bars 3 may be compared to wings pivotally connected at their inner ends to the opposite sides of the spine and having bars pivotally connecting them together at the opposite sides of the said spine. Also the wings at one side of the spine are connected with the wings at the other side by means of a cross brace. By such an arrangement a certain amount of flexibility is maintained between the bevel bars and the harrow teeth may effectually engage the soil. At the same time any movement transmitted to the bars at one side of the beam with relation to the beam is transmitted through the parts of the harrow to the bars at the other side of the beam and therefore the teeth may thoroughly scour the soil without much manual exertion on the part of the operator.

Having described the invention, what I claim as new and desire to secure by Letters Patent is:—

1. A harrow comprising a beam, forward and rear bars pivoted at the opposite sides of the beam, connecting bars pivotally attached at their forward ends to the forward side bars and pivotally attached at their rear ends to the rear side bars, a cross brace pivotally connected at its ends with the rear side bars, and handles mounted upon the pivoted connecting bars.

2. A harrow comprising a beam, forward and rear side bars pivoted thereto, connecting bars pivoted at their forward ends to the forward side bars and pivoted at their rear ends to the rear side bars, said connecting bars converging toward each other at the rear of the harrow, a cross plate pivotally connected at its ends with the rear side bars and handles mounted upon the said pivoted connecting bars.

In testimony that I claim the foregoing as my own, I have hereto affixed my signature in the presence of two witnesses.

WILLIAM J. SNOW.

Witnesses:
W. S. HARRER,
J. A. TUCKER.